(12) United States Patent
Naganishi et al.

(10) Patent No.: US 9,825,394 B2
(45) Date of Patent: Nov. 21, 2017

(54) WIRE HARNESS AND MANUFACTURING METHOD OF THE WIRE HARNESS

(71) Applicant: YAZAKI CORPORATION, Tokyo (JP)

(72) Inventors: Yukinari Naganishi, Shizuoka (JP); Kousuke Kinoshita, Shizuoka (JP); Kazuomi Kiyosue, Shizuoka (JP); Hiromichi Inoue, Shizuoka (JP); Akinori Yoshimoto, Shizuoka (JP); Yuuki Fujii, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/227,774

(22) Filed: Aug. 3, 2016

(65) Prior Publication Data

US 2017/0040085 A1 Feb. 9, 2017

(30) Foreign Application Priority Data

Aug. 5, 2015 (JP) .................................. 2015-155528
Feb. 22, 2016 (JP) .................................. 2016-031416

(51) Int. Cl.
| | |
|---|---|
| *H01B 7/00* | (2006.01) |
| *B60R 16/02* | (2006.01) |
| *H01R 13/405* | (2006.01) |
| *H01B 13/02* | (2006.01) |
| *H01R 11/09* | (2006.01) |
| *H01R 4/70* | (2006.01) |
| *H01R 11/12* | (2006.01) |
| *H01R 13/11* | (2006.01) |

(52) U.S. Cl.
CPC ....... *H01R 13/405* (2013.01); *B60R 16/0207* (2013.01); *H01R 11/09* (2013.01); *H01R 4/70* (2013.01); *H01R 11/12* (2013.01); *H01R 13/113* (2013.01); *H01R 2201/26* (2013.01)

(58) Field of Classification Search
CPC .......................... H01B 7/0045; H01B 13/012; B60R 16/0207; H01R 13/405
USPC ...................................................... 174/72 A
See application file for complete search history.

(56) References Cited

U.S. PATENT DOCUMENTS

| | | | |
|---|---|---|---|
| 2004/0230320 A1 | 11/2004 | Nagasawa et al. | |
| 2011/0294317 A1* | 12/2011 | Nishio | ................... H01R 4/305 439/95 |
| 2014/0315410 A1* | 10/2014 | Omori | ................ H01R 13/5219 439/271 |
| 2014/0353029 A1* | 12/2014 | Tsubouchi | ......... H01R 13/6463 174/72 A |
| 2015/0079845 A1* | 3/2015 | Wanha | ................ H01R 13/6477 439/607.41 |
| 2016/0211056 A1* | 7/2016 | Horiki | .................... H01R 43/20 |

FOREIGN PATENT DOCUMENTS

JP           2004-268630 A       9/2004

* cited by examiner

*Primary Examiner* — Timothy Thompson
*Assistant Examiner* — Charles Pizzuto
(74) *Attorney, Agent, or Firm* — Kenealy Vaidya LLP

(57) ABSTRACT

A wire harness includes at least two sub-harnesses having a plurality of electric wires whose one terminal portions are led out from a plurality of connector portions connected to a plurality of electric devices respectively. The other end portions of the electric wires to establish direct connection between the connector portions are electrically connected to each other by a connection mechanism.

5 Claims, 11 Drawing Sheets

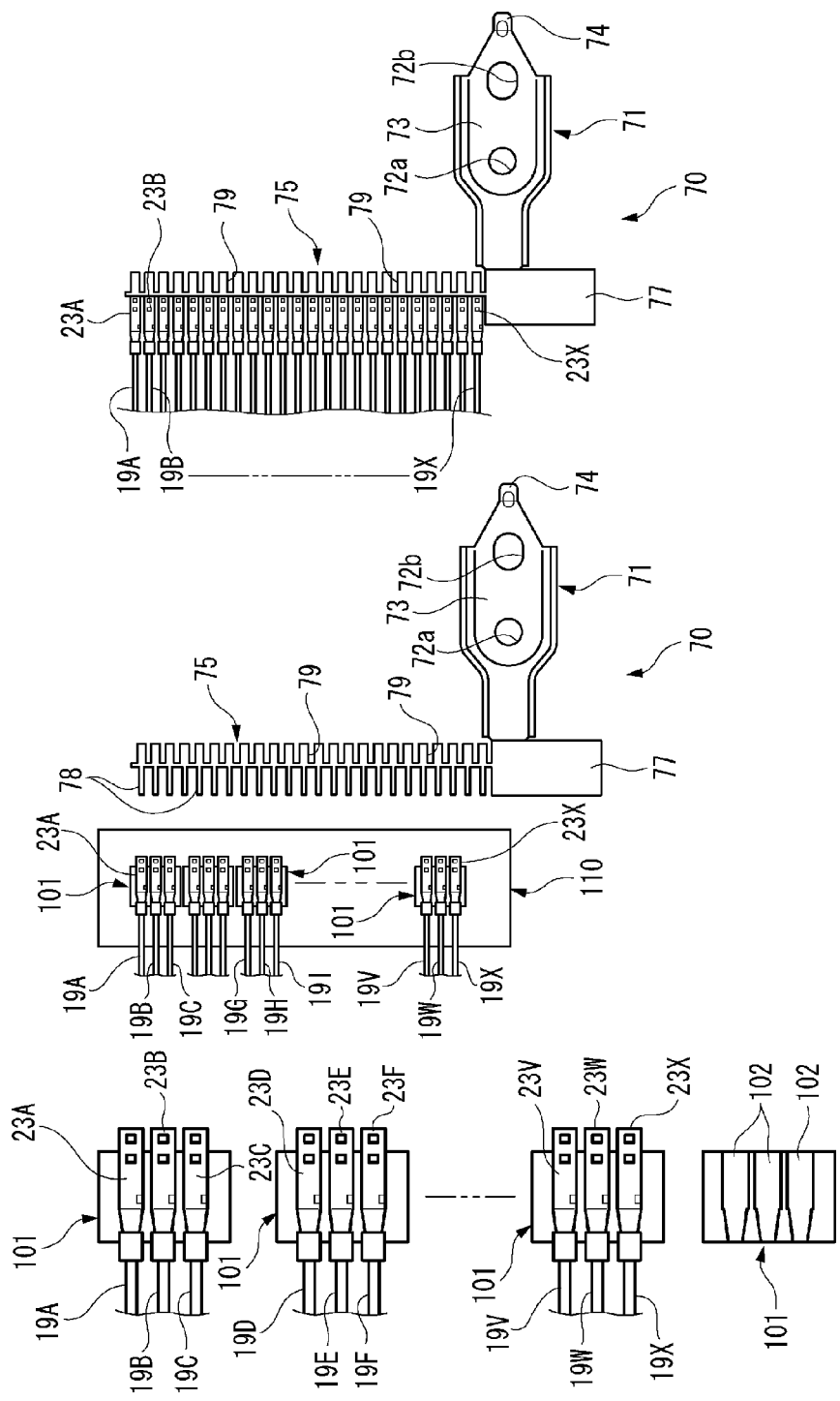

WIRE HARNESS AND MANUFACTURING METHOD OF THE WIRE HARNESS

CROSS REFERENCE TO RELATED APPLICATIONS

This application is based on Japanese Paten Application (No. 2015-155528) filed on Aug. 5, 2015 and Japanese Patent Application (No. 2016-031416) filed on Feb. 22, 2016, the contents of which are incorporated herein by reference.

BACKGROUND OF THE INVENTION

1. Field of the Invention

The present invention relates to a wire harness and a manufacturing method of the same.

2. Description of the Related Art

In the related art, a large number and various kinds of electric devices are mounted on a vehicle, and a wire harness is connected to the various kinds of electric devices. Electric power supplied from a battery, control signals for controlling the electrical devices, etc. are supplied through the wire harness. When such a wire harness is manufactured, the wire harness is determined to be suitable as a whole in consideration of the layout of connectors, terminals of the connectors, kinds of electric wires, etc.

In addition, in a typical wire harness to be arranged in a vehicle, a plurality of sub-harnesses which, for example, belong to sub-groups corresponding to system circuits so that each sub-harness can be provided for a corresponding one of the circuits are combined into the wire harness as a while. That is, the wire harness is constituted by a combination of sub-harnesses respectively having specific component numbers for harness parts depending on a combination of electrical systems (for example, see JP-A-2004-268630).

However, the number of harness components tends to increase with diversification of kinds of vehicles, grades, specifications, etc. Accordingly, there is a problem that harnesses are manufactured in a wider-variety smaller-lot production form, and management becomes troublesome in spite of poor productivity. Therefore, in a wire harness disclosed in the aforementioned JP-A-2004-268630, circuits are divided into a common circuit independent of the existence of electrical systems that can be selected and a dedicated circuit for each electrical system that can be selected, and the common circuit and the dedicated circuit for each related electrical system are removably connected and combined through a branch connector (joint connector, junction box, junction block, etc.) so that a desired wire harness can be formed easily.

In recent years, as a communication system for controlling a plurality of electric devices mounted on a vehicle, there has been used a vehicle network system in which a plurality of electronic control units for controlling the electric devices respectively are connected to one another through a common multiplex communication line, and multiplexed signals are transmitted and received through the multiplex communication line so that operations of the electric devices can be controlled based on the multiplexed signals respectively. In addition, due to increase in number of circuits and sophistication of wire harnesses, assembling work cannot be finalized for each sub-harness. When a plurality of sub-harnesses are combined, post-fitting may be carried out in some sub-harnesses. In such a sub-harness, a terminal with an electric wire must be inserted into a connector (connector housing) of a mating sub-harness. There is a problem that the number of sub-harnesses requiring such post-fitting increases.

For example, a related-art wire harness 501 shown in FIG. 10 is constituted by a first sub-harness 510 and a second sub-harness 530. The first sub-harness 510 includes connectors (connector portions) CA, CB and CC, power supply lines 11A, 11B and 11C, CAN (Controller Area Network) communication lines 13A, 13B and 13C, and ground lines 19A, 19B and 19C. The connectors CA, CB and CC are connected to various electric devices A to C respectively. The power supply lines 11A, 11B and 11C are electric wires led out from the connectors CA, CB and CC respectively. In the same manner, the second sub-harness 530 also includes connectors (connector portions) CD, CE and CF, power supply lines 11D, 11E and 11F, CAN communication lines 13D, 13E and 13F, and ground lines 19D, 19E and 19F. The connectors CD, CE and CF are connected to various electric devices D to F respectively. The power supply lines 11D, 11E and 11F are electric wires led out from the connectors CD, CE and CF respectively. Further, among the connectors CA to CF, general communication lines 515, 517, 519, 521 and 523 for establishing direct connection with the electric devices A to F are connected suitably.

When the first sub-harness 510 is formed in a sub-harness manufacturing step, terminals (not shown) are connected to core wires at one terminal ends of the power supply lines 11A, 11B and 11C, the CAN communication lines 13A, 13B and 13C, the ground lines 19A, 19B and 19C and the general communication lines 515, 517, 519, 521 and 523 respectively. Then, as shown in FIG. 11, terminals 25A, 25B and 25C are connected to core wires at the other terminal ends of the power supply lines 11A, 11B and 11C respectively, connectors 21A, 21B and 21C are connected to the other terminal ends of the CAN communication lines 13A, 13B and 13C respectively, terminals 23A, 23B and 23C are connected to the other terminal ends of the ground lines 19A, 19B and 19C respectively, and terminals 551, 553, 555, 557 and 559 are connected to the other terminal ends of the general communication lines 515, 517, 519, 521 and 523 respectively.

On the other hand, when the second sub-harness 530 is formed, terminals (not shown) are connected to core wires at one terminal ends of the power supply lines 11D, 11E and 11F, the CAN communication lines 13D, 13E and 13F, and the ground lines 19D, 19E and 19F respectively. Then, as shown in FIG. 11, terminals 25D, 25E and 25F are connected to core wires at the other terminal ends of the power supply lines 11D, 11E and 11F respectively, connectors 21D, 21E and 21F are connected to the other terminal ends of the CAN communication lines 13D, 13E and 13F respectively, terminals 23D, 23E and 23F are connected to the other terminal ends of the ground lines 19D, 19E and 19F respectively.

In a wire harness manufacturing step, in the first sub-harness 510 and the second sub-harness 530 formed thus in advance, one terminal ends of the electric wires are connected to the electric devices A to F respectively, and the other terminal ends of the electric wires are connected to a power supply junction block 3, a CAN joint connector 5 and ground joint terminals 7 respectively. In addition, terminals 61 at opposite terminal ends of a ground line 62 in a ground connection line 60 are connected to the ground joint terminals 7 respectively, and the other terminal ends of the general communication lines 515, 517, 519, 521 and 523 are connected to the connectors CD, CE, CF and CC respectively. Thus, the wire harness 501 can be formed.

However, as is apparent from FIG. 11, when the first sub-harness 510 and the second sub-harness 530 are combined to form the wire harness 501, in the general communication lines 515, 517, 519, 521 and 523 whose one terminal ends are connected to the connectors CA, CB and CC, the terminals 551, 553, 555, 557 and 559 at the other terminal ends must be post-fitted to connector housings of the connectors CD, CE, CF and CC respectively. That is, the terminals 551, 553, 555, 557 and 559 with the electric wires must be inserted into the connector housings while parting the power supply lines 11C, 11D, 11E, 11F and 11C, the CAN communication lines 13D, 13E, 13F and 13C and the ground lines 19D, 19E, 19F and 19C, which have been connected to the connector housings of the connectors CD, CE, CF and CC respectively.

It is difficult to automate post-fitting of terminals in such a wire harness manufacturing step. Terminals with electric wires are often inserted into connectors by a worker on a conveyor. Thus, the workability is so poor that a human insertion mistake may cause erroneous wiring.

SUMMARY OF THE INVENTION

The present invention has been developed in consideration of the aforementioned situation. An object of the invention is to provide a wire harness capable of reducing post-fitting of terminals with electric wires to connector portions to thereby enhance productivity, and a method for manufacturing the same.

The aforementioned object of the invention is attained by the following configurations.

(1) A wire harness including at least two sub-harnesses having a plurality of electric wires whose one end portions are led out from a plurality of connector portions connected to a plurality of electric devices respectively, wherein the other end portions of the electric wires to establish direct electrical connection between the connector portions are electrically connected to each other by a connection mechanism.

According to the wire harness having the aforementioned configuration (1), of the electric wires that are electrically connected to each other in intermediate portions between the connector portions by the connection mechanism such as connection terminals, terminals at opposite end portions (one end portions of the electric wires) can be inserted into desired connector portions respectively in a sub-harness manufacturing step in the state where the intermediate portions (the other end portions of the electric wires) have been separated from each other. Then, in a harness manufacturing step in which the sub-harnesses are combined, the electric wires separated from each other in the intermediate portions can be electrically connected to each other by the connection mechanism respectively.

Accordingly, in the harness manufacturing step, the electric wires to establish direct electrical connection between desired ones of the connector portions can be connected by simple connection work using the connection mechanism. Thus, post-fitting work of terminals with electric wires to the connector portions can be reduced. Therefore, in the wire harness having the aforementioned configuration (1), the workability can be improved, and the possibility to cause erroneous wiring can be also reduced.

(2) A wire harness according to the aforementioned configuration (1), wherein at least a part of connection mechanisms in the electric wires to establish direct connection between, of the connector portions, a plurality of pairs of connector portions respectively are disposed adjacently to one another.

According to the wire harness having the aforementioned configuration (2), at least a part of the connection mechanisms in the electric wires are disposed adjacently to one another, so that connection work of the connection mechanisms can be carried out continuously and easily.

(3) A wire harness according to the aforementioned configuration (1), wherein the connection mechanism is a ground joint terminal that electrically connects intermediate portions of ground lines in the electric wires;
wherein the ground joint terminal includes a terminal body, and a belt-like terminal connection portion extending from the terminal body;
wherein in one of side edge portions in a longitudinal direction of the terminal connection portion, a plurality of tab terminals protruding in a direction perpendicular to the longitudinal direction of the terminal connection portion are disposed at predetermined intervals; and
wherein the terminal connection portion in which terminals connected to the ground lines are connected to the tab terminals is wound longitudinally.

According to the wire harness having the aforementioned configuration (3), the other terminal ends of the ground lines are connected using the ground joint terminal, so that connection work of the ground lines can be carried out collectively and easily.

The ground lines are divided into divisions for each sub-harness, and divisions of the ground lines are connected collectively in a subsequent step. Thus, the automation rate by a terminal insertion machine is increased so that post-fitting work of terminals at one terminal ends of the ground lines can be reduced. In addition, the belt-line terminal connection portion to which the ground lines are connected collectively is fixed to a ground surface such as a body of a vehicle in the state where the terminal connection portion is wound in the longitudinal direction. Accordingly, the ground joint terminal can be attached to the vehicle compactly.

(4) A manufacturing method of a wire harness including at least two sub-harnesses having a plurality of electric wires whose one end portions are led out from a plurality of connector portions connected to a plurality of electric devices respectively, the manufacturing method including: a sub-harness manufacturing step in which terminals provided in the one end portions of the electric wires whose other end portions are configured to be electrically connected to each other by a connection mechanism in order to establish direction connection between the connector portions are inserted into the connector portions respectively in a state that the other end portions are separated from each other; and a harness manufacturing step in which the other end portions of the electric wires are electrically connected to each other by the connection mechanism in order to establish direction connection between the connector portions.

For example, the harness manufacturing step is carried out after the sub-harness manufacturing step.

According to the wire harness manufacturing method having the configuration (4), in the sub-harness manufacturing step, terminals in opposite end portions of the electric wires divided into two in their intermediate portions are inserted into desired connector portions, and in the harness manufacturing step, the electric wires divided into two in their intermediate portions are electrically connected by the connection mechanism such as connection terminals.

Accordingly, the electric wires for establishing direct electrical connection between desired connector portions can be connected by simple connection work using the connection mechanism. Thus, post-fitting work of terminals to the connector portions can be reduced. Therefore, according to the wire harness manufacturing method having the aforementioned configuration (4), the workability can be improved, and possibility to cause erroneous wiring can be also reduced, so that a good wire harness can be manufactured.

According to a wire harness and a manufacturing method of the same according to the invention, it is possible to reduce post-fitting of terminals with electric wires to connector portions to thereby enhance the productivity.

The invention has been described briefly above. Further, the details of the invention will be made clearer if the following mode for carrying out the invention (hereinafter referred to as "exemplary embodiment") is read through with reference to the accompanying drawings.

BRIEF DESCRIPTION OF THE DRAWINGS

FIGS. 7A to 7C are explanatory views for explaining the configuration and connection procedure of the ground joint terminal for establishing collective connection of the other terminal ends of ground lines.

DETAILED DESCRIPTION OF THE EXEMPLARY EMBODIMENTS An exemplary embodiment according to the invention will be described below with reference to the drawings.

Figure 1:
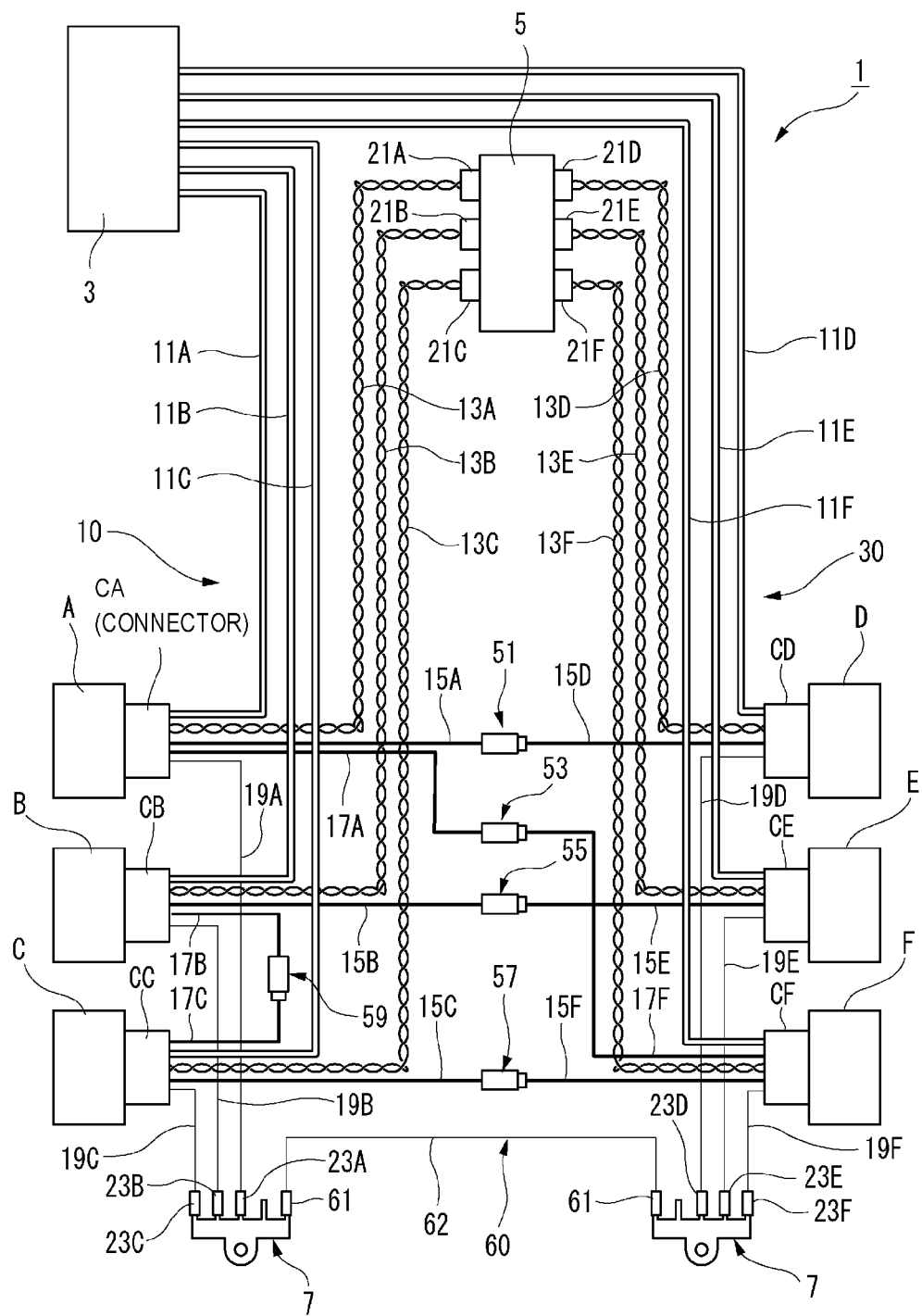
FIG. 1 is a schematic view of a wire harness according to an exemplary embodiment of the invention.
Figure 2:
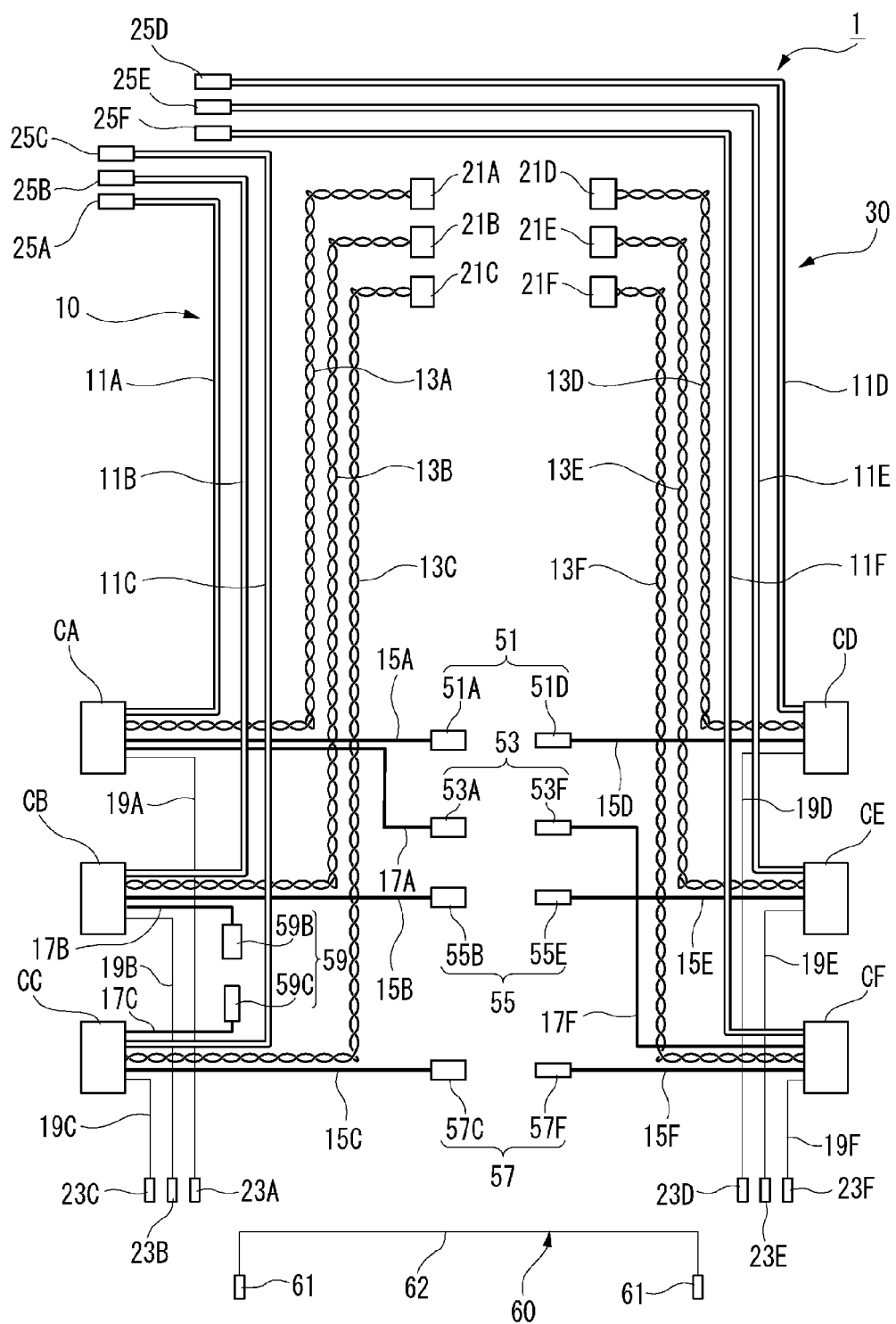
FIG. 2 is an exploded schematic view showing first and second sub-harnesses in the wire harness shown in FIG. 1.

As shown in FIGS. 1 and 2, a wire harness 1 according to the exemplary embodiment of the invention has a first sub-harness 10 and a second sub-harness 30. Incidentally, in the exemplary embodiment, description will be made about a wire harness formed by a combination of two sub-harnesses by way of example. However, it is a matter of course that a wire harness can be formed by a combination of three or more sub-harnesses.

The wire harness 1 according to the exemplary embodiment is formed by a combination of the first sub-harness 10 and the second sub-harness 30 by a wire harness manufacturing method including a sub-harness manufacturing step and a harness manufacturing step. The first sub-harness 10 has a plurality of electric wires whose one terminal ends are led out from connectors CA, CB and CC serving as connector portions to be connected to a plurality of electric devices A to C respectively. The second sub-harness 30 has a plurality of electric wires whose one terminal ends are led out from connectors CD, CE and CF serving as connector portions to be connected to a plurality of electric devices D to F respectively. Incidentally, the connector portions in the invention are not limited to connectors to be connected to electric devices, but they may be provided as connectors connected directly to circuits of electric devices and formed integrally with the electric devices.

General communication lines 15A and 15D serve as electric wires to be electrically connected to each other in an intermediate portion thereof by a connection terminal 51 serving as a connection mechanism. In the sub-harness manufacturing step, terminals in opposite end portions of the general communication lines 15A and 15D are inserted into desired connectors CA and CD respectively in the state where the general communication lines 15A and 15D have been divided into two in the intermediate portion. In the same manner, general communication lines 17A and 17F serve as electric wires to be electrically connected to each other in an intermediate portion thereof by a connection terminal (connection mechanism) 53. Terminals in opposite end portions of the general communication lines 17A and 17F are inserted into desired connectors CA and CF respectively in the state where the general communication lines 17A and 17F have been divided into two in the intermediate portion. Of general communication lines 15B and 15E to be electrically connected to each other in an intermediate portion thereof by a connection terminal (connection mechanism) 55, terminals in opposite end portions are inserted into desired connectors CB and CE respectively in the state where the general communication lines 15B and 15E have been divided into two in the intermediate portion. Of general communication lines 15C and 15F to be electrically connected to each other in an intermediate portion thereof by a connection terminal (connection mechanism) 57, terminals in opposite end portions are inserted into desired connectors CC and CF respectively in the state where the general communication lines 15C and 15F have been divided into two in the intermediate portion. Of general communication lines 17B and 17C to be electrically connected to each other in an intermediate portion thereof by a connection terminal (connection mechanism) 59, terminals in opposite end portions are inserted into desired connectors CB and CC respectively in the state where the general communication lines 17B and 17C have been divided into two in the intermediate portion.

In the harness manufacturing step, in order to establish direct electrical connection between the desired connectors CA and CD, the general communication lines 15A and 15D divided into two in the intermediate portion are electrically connected by the communication terminal 51. In the same manner, in order to establish direct electrical connection between the desired connectors CA and CF, the general communication lines 15A and 15D are electrically connected by the communication terminal 51. In order to establish direct electrical connection between the desired connectors CB and CE, the general communication lines 15B and 15E are electrically connected by the communication terminal 55. In order to establish direct electrical connection between the desired connectors CC and CF, the general communication lines 15C and 15F are electrically connected by the communication terminal 57. In order to establish direct electrical connection between the desired connectors CB and CC, the general communication lines 17B and 17C are electrically connected by the communication terminal 59.

Further, in the wire harness 1 according to the exemplary embodiment, the connection terminals 51, 53, 55 and 57 between the general communication lines 15A and 15D, between the general communication lines 17A and 17F, between the general communication lines 15B and 15E, between the general communication lines 15C and 15F and between the general communication lines 17B and 17C to establish direct connection between a plurality of pairs of the connectors CA, CB, CC, CD, CE and CF are disposed adjacently to each other.

The first sub-harness 10 according to the exemplary embodiment includes the connectors CA, CB and CC to be connected to various electric devices A to C respectively, power supply lines 11A, 11B and 11C that are electric wires led out from the connectors CA, CB and CC respectively, CAN (Controller Area Network) communication lines 13A, 13B and 13C, ground lines 19A, 19B and 19C, and the general communication lines 15A, 17A, 15B, 17B and 15C.

On the other hand, the second sub-harness 30 according to the exemplary embodiment includes the connectors CD, CE and CF to be connected to various electric devices D to F respectively, power supply lines 11D, 11E and 11F led out from the connectors CD, CE and CF respectively, CAN communication lines 13D, 13E and 13F, ground lines 19D, 19E and 19F, and the general communication lines 15D, 15E, 17F and 15F.

In the intermediate portions of the electric wires establishing direction connection between the connectors CA and CD, between the connectors CA and CF, between the connectors CB and CE, between the connectors CB and CC and between the connectors CC and CF, electric connection is secured by the removable connection terminals 51, 53, 55, 59 and 57 respectively. That is, connection between the connectors CA and CD is secured by the connection terminal 51 in which a female terminal 51A connected to the other terminal end of the general communication line 15A and a male terminal 51D connected to the other terminal end of the general communication line 15D are fitted to each other. In the same manner, connection between the connectors CA and CF is secured by the connection terminal 53 in which a female terminal 53A connected to the other terminal end of the general communication line 17A and a male terminal 53F connected to the other terminal end of the general communication line 17F are fitted to each other. Connection between the connectors CB and CE is secured by the connection terminal 55 in which a female terminal 55B connected to the other terminal end of the general communication line 15B and a male terminal 55E connected to the other terminal end of the general communication line 15E are fitted to each other. Connection between the connectors CB and CC is secured by the connection terminal 59 in which a female terminal 59B connected to the other terminal end of the general communication line 17B and a male terminal 59C connected to the other terminal end of the general communication line 17C are fitted to each other. Connection between the connectors CC and CF is secured by the connection terminal 57 in which a female terminal 57C connected to the other terminal end of the general communication line 15C and a male terminal 57F connected to the other terminal end of the general communication line 15F are fitted to each other.

When the first sub-harness 10 is formed in the sub-harness manufacturing step, terminals (not shown) are connected to core wires at one terminal ends of the power supply lines 11A, 11B and 11C, the CAN communication lines 13A, 13B and 13C, the ground lines 19A, 19B and 19C, and the general communication lines 15A, 17A, 15B, 17B, 17C and 15C respectively. Then, as shown in FIG. 2, terminals 25A, 25B and 25C are connected to core wires at the other terminal ends of the power supply lines 11A, 11B and 11C; connectors 21A, 21B and 21C are connected to the other terminal ends of the CAN communication lines 13A, 13B and 13C; terminals 23A, 23B and 23C are connected to the other terminal ends of the ground lines 19A, 19B and 19C; the female terminals 51A, 53A, 55B, 59B and 57C are connected to the other terminal ends of the general communication lines 15A, 17A, 15B, 17B and 15C; and the male terminal 59C is connected to the other terminal end of the general communication line 17C.

On the other hand, when the second sub-harness 30 is formed, terminals (not shown) are connected to core wires at one terminal ends of the power supply lines 11D, 11E and 11F, the CAN communication lines 13D, 13E and 13F, the ground lines 19D, 19E and 19F, and the general communication lines 15D, 15E, 17F and 15F respectively. Then, as shown in FIG. 2, terminals 25D, 25E and 25F are connected to core wires at the other terminal ends of the power supply lines 11D, 11E and 11F; connectors 21D, 21E and 21F are connected to the other terminal ends of the CAN communication lines 13D, 13E and 13F; terminals 23D, 23E and 23F are connected to the other terminal ends of the ground lines 19D, 19E and 19F; and the male terminals 51D, 53F, 55E and 57F are connected to the other terminal ends of the general communication lines 15D, 15E, 17F and 15F.

Figure 3:
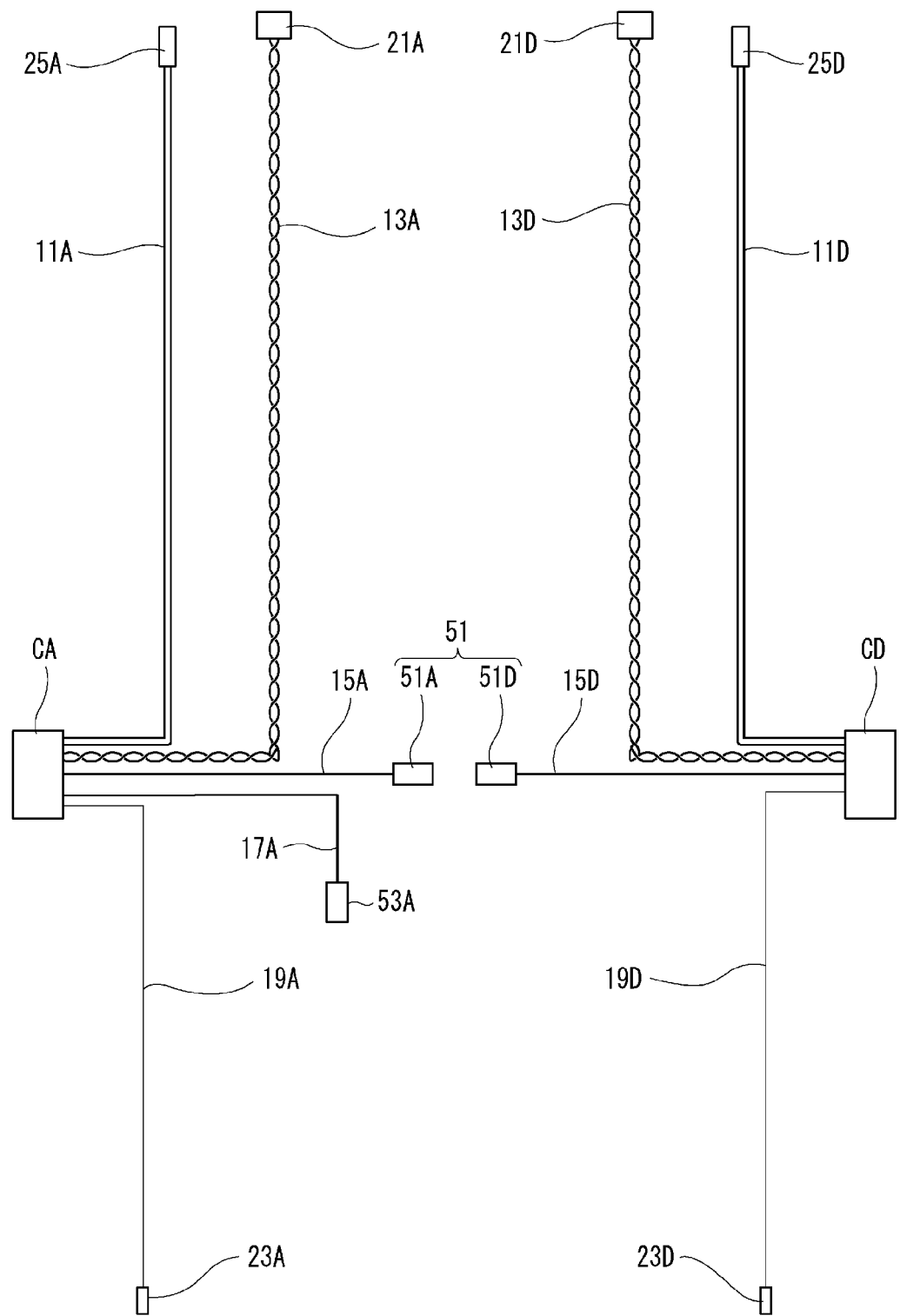
FIG. 3 is a main portion schematic view for explaining electric wires whose one terminal ends are led out respectively from connectors in the first and second sub-harnesses shown in FIG. 2.

Here, as shown in FIG. 3 by way of example, in the sub-harness manufacturing step, terminals connected to the terminal ends of the power supply line 11A, the CAN communication line 13A, the ground line 19A and the general communication lines 15A and 17A are connected to a connector housing of the connector CA, and terminals connected to the terminal ends of the power supply line 11D, the CAN communication line 13D, the ground line 19D and the general communication line 15D are connected to a connector housing of the connector CD. That is, the general communication lines 15A and 15D that are electric wires to be electrically connected to each other in an intermediate portion thereof by the connection terminal 51. In the sub-harness manufacturing step, terminals in opposite end portions of the general communication lines 15A and 15D are inserted into desired connectors CA and CD respectively in the state where the general communication lines 15A and 15D have been divided into two in the intermediate portion.

Thus, such insertion of terminals with electric wires to connector housings of the connectors CA, CB, CC, CD, CE and CF can be automated by a terminal insertion machine in the sub-harness manufacturing step in which a plurality of sub-harnesses have not been combined yet.

Figure 4:
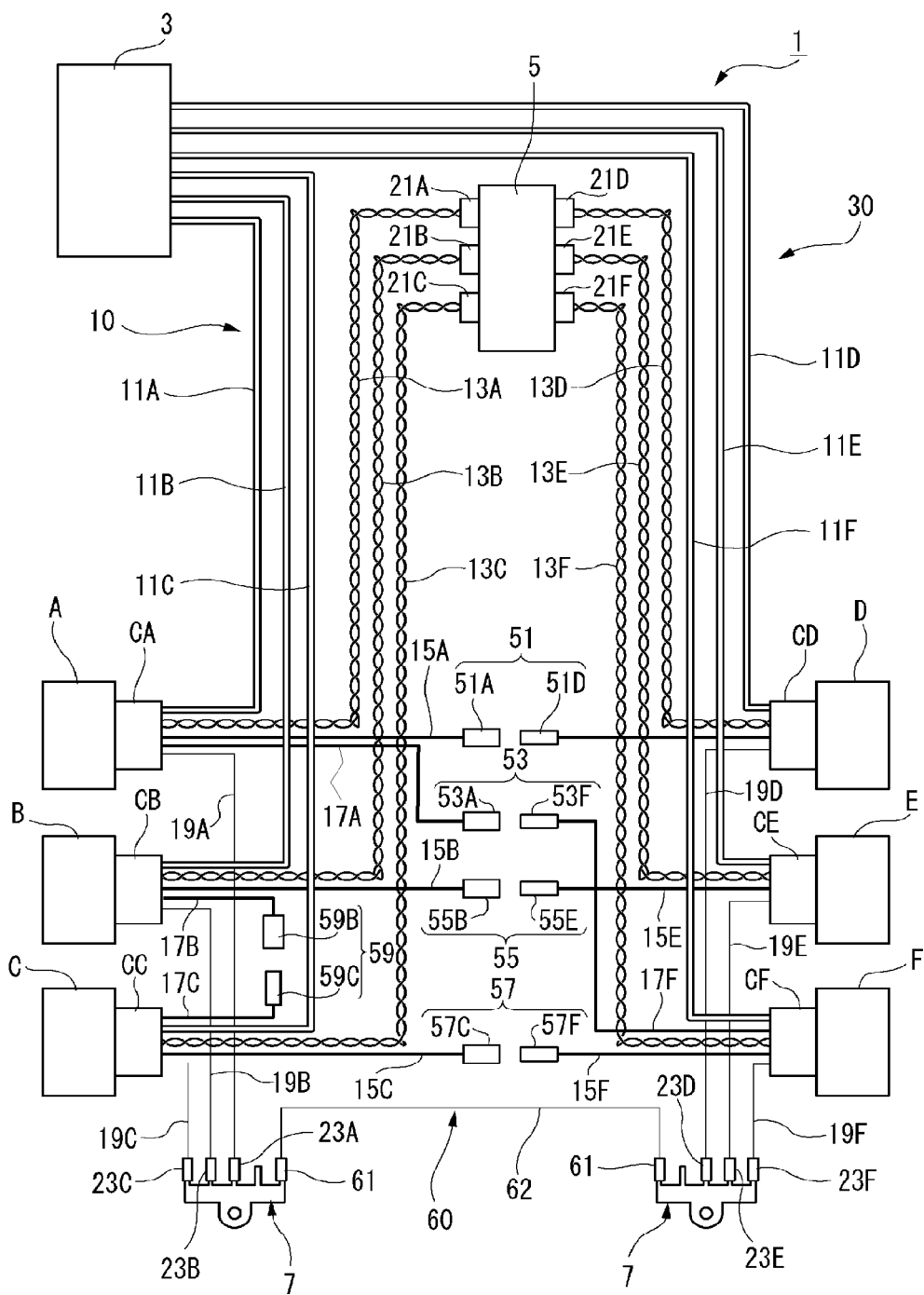
FIG. 4 is a schematic view for explaining a harness manufacturing step in which the first and second sub-harnesses shown in FIG. 2 are combined.

Then, as shown in FIG. 4, in the harness manufacturing step, one terminal ends of the electric wires in the first sub-harness 10 and the second sub-harness formed in advance in the sub-harness manufacturing step are connected to the electric devices A to F respectively, and the other terminal ends of the electric wires are connected to a power supply junction block 3, a CAN joint connector 5 and ground joint terminals 7 respectively. Then, terminals 61 at opposite terminal ends of a ground line 62 in a ground connection line 60 are connected to the ground joint terminals 7 respectively, while the connection terminals 51, 53, 55, 57 and 59 are connected individually. Thus, the wire harness 1 is formed.

Figure 5A:
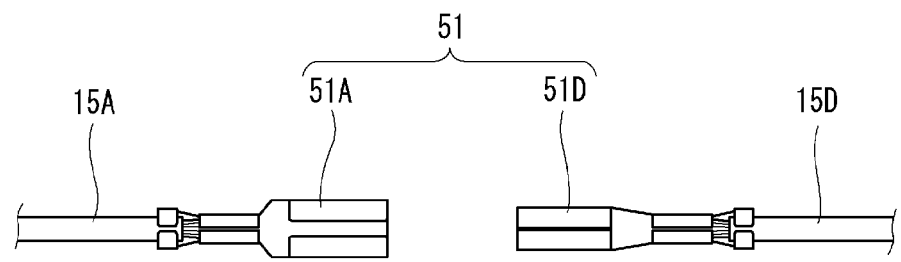
FIGS. 5A to 5C are main portion exploded views for explaining a connection procedure of a connection mechanism shown in FIG. 4.
Figure 5B:
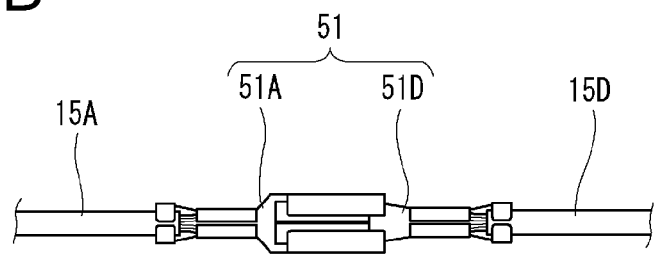
Figure 5C:
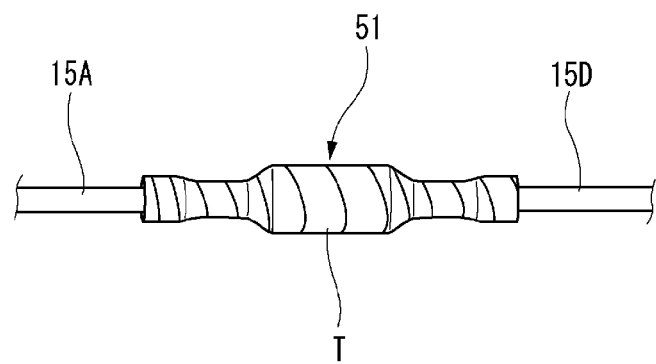

As shown in FIG. 5A, the connection terminal 51 serving as a connection mechanism is constituted by the female terminal 51A connected to the other terminal end of the general communication line 15A, and the male terminal 51D connected to the other terminal end of the general communication line 15D. Then, the female terminal 51A and the male terminal 51D are fitted as the connection terminal 51 as shown in FIG. 5B, and an insulating tape T is wound on the connection terminal 51 so as to be electrically insulated as shown in FIG. 5C. The other connection terminals 53, 55, 57 and 59 are configured in the same manner.

Incidentally, the connection mechanisms according to the invention are not limited to the configuration of the connection terminals 53, 55, 57 and 59 according to the exemplary embodiment. It is a matter of course that various forms can be taken as long as they can provide easy connection in the harness manufacturing step.

For example, core wires in electric wires divided into two in an intermediate portion thereof may be welded by spot welding or laser welding, or may be connected directly by soldering. Alternatively, terminal ends of the electric wires divided into two may be connected by crimping or through a relay terminal bringing the terminal ends into pressure contact.

That is, according to the wire harness 1 according to the exemplary embodiment, in each pair of the general communication lines 15A and 15D to be electrically connected in an intermediate portion thereof, the general communication lines 17A and 17F to be electrically connected likewise, the general communication lines 15B and 15E to be electrically connected likewise, the general communication lines 15C and 15F to be electrically connected likewise, and the general communication lines 17B and 17C to be electrically connected likewise, terminals in the opposite end portions of the pair can be inserted into desired ones of the connectors CA, CB, CC, CD, CE and CF in the sub-harness manufacturing step in the state where the pair have been divided into two in their intermediate portion. In addition, each of terminals at one terminal ends of the ground lines 19A, 19B, 19C, 19D, 19E and 19F can be inserted into desired one of the connectors CA, CB, CC, CD, CE and CF in the sub-harness manufacturing step.

Then, in the harness manufacturing step in which the first sub-harness 10 and the second sub-harness 30 are combined, the pairs of the general communication lines 15A and 15D, the general communication lines 17A and 17F, the general communication lines 15B and 15E, the general communication lines 15C and 15F and the general communication lines 17B and 17C divided into two in their intermediate portions are electrically connected to each other by the connection terminals 51, 53, 55, 57 and 59 respectively, and the other terminal ends of the ground lines 19A, 19B, 19C, 19D, 19E and 19F are connected to the ground joint terminals 7 by the terminals 23A, 23B, 23C, 23D, 23E and 23F respectively.

Thus, in the harness manufacturing step, the pairs of the general communication lines 15A and 15D, the general communication lines 17A and 17F, the general communication lines 15B and 15E, the general communication lines 15C and 15F and the general communication lines 17B and 17C for establishing direct electrical connection between desired ones of the connectors CA, CB, CC, CD, CE and CF can be connected to each other by simple connection work using the connection terminals 51, 53, 55, 57 and 59. The other terminals of the ground lines 19A, 19B, 19C, 19D, 19E and 19F can be also connected to desired one of the ground joint terminals 7 collectively. Accordingly, post-fitting work of terminals with electric wires to the connectors CA, CB, CC, CD, CE and CF can be reduced. Therefore, in the wire harness 1 according to the exemplary embodiment, the workability can be improved, and possibility to cause erroneous wiring can be also reduced. In addition, since the post-fitting work of terminals with electric wires is reduced, automation using a terminal insertion machine can be carried out.

In addition, according to the wire harness 1 according to the exemplary embodiment, the connection terminals 51, 53, 55 and 57 are disposed adjacently to one another, so that connection work of the connection terminals 51, 53, 55 and 57 can be carried out continuously and easily.

Further, according to the wire harness manufacturing method according to the exemplary embodiment, in the harness manufacturing step, the pairs of the general communication lines 15A and 15D, the general communication lines 17A and 17F, the general communication lines 15B and 15E, the general communication lines 15C and 15F and the general communication lines 17B and 17C for establishing desired direct electrical connection between the connectors CA and CD, the connectors CA and CF, the connectors CB and CE, the connectors CB and CC and the connectors CC and CF can be connected to each other by simple connection work using the connection terminals 51, 53, 55 and 57. Accordingly, post-fitting work of terminals with electric wires to the connectors CA, CB, CC, CD, CE and CF can be reduced. Therefore, according to the wire harness manufacturing method according to the exemplary embodiment, the workability can be improved, and possibility to cause erroneous wiring can be also reduced. Thus, the good wire harness 1 can be manufactured. In addition, since the post-fitting work of terminals with electric wires is reduced, automation using a terminal insertion machine can be carried out. Thus, the manufacturing cost of the wire harness 1 can be also reduced.

Thus, according to the wire harness 1 and the manufacturing method of the same according to the exemplary embodiment, post-fitting of terminals with electric wires to the connectors CA, CB, CC, CD, CE and CF can be reduced to enhance the productivity.

Incidentally, the configuration of the ground joint terminals according to the manufacturing method of a wire harness according to the invention is not limited to the ground joint terminals 7 according to the aforementioned exemplary embodiment, but various forms may be taken.

Figure 6:
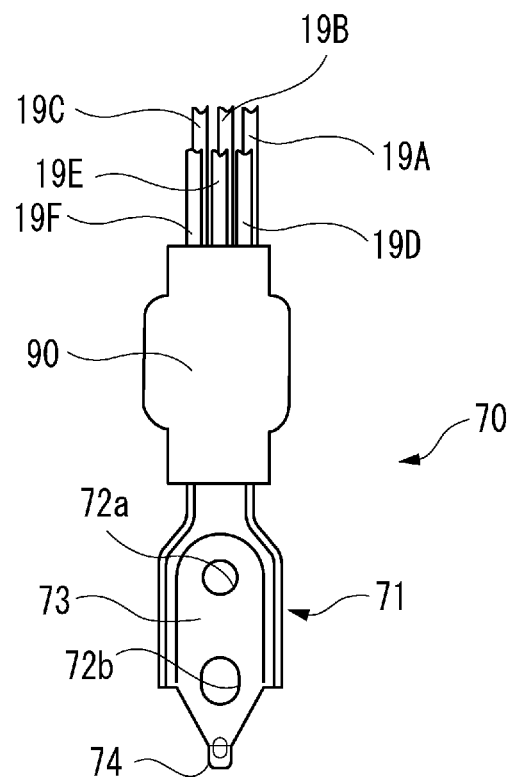
FIG. 6 is an exploded plan view for explaining a ground joint terminal as the connection mechanism.

For example, a ground joint terminal 70 (which will be described later in detail) may be used as connection mechanisms as shown in FIG. 6. In this case, electrical connection can be made in an intermediate portion between each of pairs of ground lines 19A and 19D, ground lines 19B and 19E and ground lines 19C and 19F by the ground joint terminal 70. In the sub-harness manufacturing step, in the state where each pair is divided into two in the intermediate portion, terminals in the opposite end portions of the pair can be inserted into desired ones of the connectors CA, CB, CC, CD, CE and CF.

Then, in the harness manufacturing step in which the first sub-harness 10 and the second sub-harness 30 are combined, electrical connection between each pair of the ground lines 19A and 19D, the ground lines 19B and 19E and the ground lines 19C and 19F each divided into two in their intermediate portion is established by the ground joint terminal 70.

In the harness manufacturing step, the other terminal ends of the ground lines 19A, 19B, 19C, 19D, 19E and 19F for establishing direct electrical connection among the connectors CA, CB, CC, CD, CE and CF can be connected to the ground joint terminal 70 collectively. Thus, post-fitting work of terminals with electric wires to the connectors CA, CB, CC, CD, CE and CF can be reduced.

Next, the configuration of the ground joint terminal 70 used as connection mechanisms will be described.

FIGS. 7A to 8C are explanatory views for explaining the configuration and connection procedure of the ground joint terminal 70 for making collective connection with the other terminal ends of a plurality of ground lines 19 (19A to 19X).

The ground joint terminal 70 has a terminal body 71 and a terminal connection portion 75 as shown in FIG. 7B. The ground joint terminal 70 is an article formed out of a conductive metal plate by press forming. The terminal body 71 has a fixing plate portion 73 having an oval shape in planar view. A circular mounting hole 72a and an oval mounting hole 72b are formed in the fixing plate portion 73. The terminal body 71 is fixed to the ground surface such as the body of the vehicle by a pair of bolts (not shown) inserted into the mounting holes 72a and 72b of the fixing plate portion 73.

A rotation stop piece 74 is formed in one end portion of the fixing plate portion 73. The rotation stop piece 74 is a bent portion for engaging with a step or a hole portion around the ground surface to which the terminal body 71 should be fastened by the bolts. When the rotation stop piece 74 engages with the step or the hole portion around the ground surface, rotation of the ground joint terminal 70 relative to the ground surface is restricted.

The belt-like terminal connection portion 75 extending from the terminal body 71 has a strip-like connection base portion 77, and a plurality of tab terminals 78 and slits 79 provided continuously to one end edge of the connection base portion 77. Specifically, a base portion of the belt-like plate fixing plate portion extending in a direction perpendicular to the longitudinal direction of the fixing plate portion 73 in the other end portion of the fixing plate portion 73 is set as the connection base portion 77. A plurality (24 pieces in the exemplary embodiment) of tab terminals 78 are press-formed integrally with one side edge portion (side edge portion on the opposite side to the fixing plate portion 73) so as to be arrayed in the longitudinal direction of the belt-like plate portion. A plurality of slits 79 are press-formed integrally with the other side edge portion so as to be arrayed in the longitudinal direction of the belt-like plate portion.

The tab terminals 78 provided to protrude in the direction perpendicular to the longitudinal direction of the terminal connection portion 75 are disposed at predetermined intervals from one another in their width direction. For example, the terminals 23A to 23X connected to the other terminal ends of the ground lines 19 (19A to 19X) in the wire harness (not shown) in which a plurality of sub-harnesses are combined are connected to the tab terminals 78 collectively and respectively (see FIG. 7C).

The slits 79 are disposed at predetermined intervals from one another so as to be arrayed in the longitudinal direction of the belt-like terminal connection portion 75. The slits 79 serve to bend the belt-like terminal connection portion 75 easily when the terminal connection portion 75 is wound longitudinally (see FIG. 8B).

Next, description will made about a connection procedure in which the other terminal ends of a plurality of ground lines 19 (19A to 19X) are connected collectively by use of the aforementioned ground joint terminal 70 when a wire harness is formed by a combination of a plurality of sub-harnesses.

First, as shown in FIG. 7A, the terminals 23A to 23X connected to the other terminal ends of the ground lines 19 (19A to 19X) in the combined sub-harnesses are set in a plurality of terminal holding jigs 101 provided for the sub-harnesses respectively. That is, each terminal holding jig 101 has a terminal holding portion 102 which can hold three terminals in parallel. Each terminal holding jig 101 can hold three terminals in one of the sub-harnesses, that is, the terminals 23A, 23B and 23C, the terminals 23D, 23E and 23F, . . . or the terminals 23V, 23W and 23X.

Next, as shown in FIG. 7B, the terminal holding jigs 101 are fixed to a collective coupling jig 110 so that the terminals 23A to 23X can be disposed straightly at predetermined intervals in their width direction. Then, the terminals 23A to 23X disposed straightly on the collective coupling jig 110 are disposed at the same intervals as the pitch of the tab terminals 78 in the ground joint terminal 70.

Next, as shown in FIG. 7B, the ground lines 19 (19A to 19X) are collectively connected to the tab terminals 78 of the ground joint terminal 70 through the terminals 23A to 23X. Since the terminals 23A to 23X are disposed straightly at the same intervals as the pitch of the tab terminals 78, the tab terminals 78 can be coupled collectively and easily.

Figure 8A:
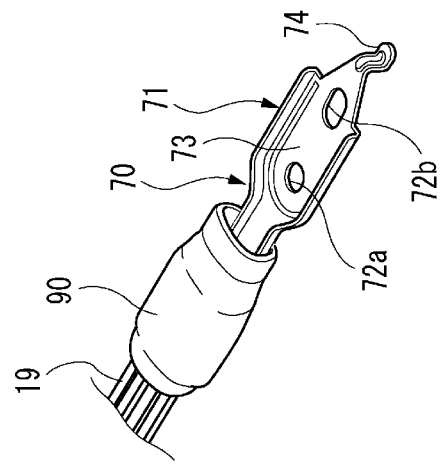
FIGS. 8A to 8C are explanatory views for explaining the configuration and connection procedure of the ground joint terminal for establishing collective connection of the other terminal ends of the ground lines.
Figure 8B:
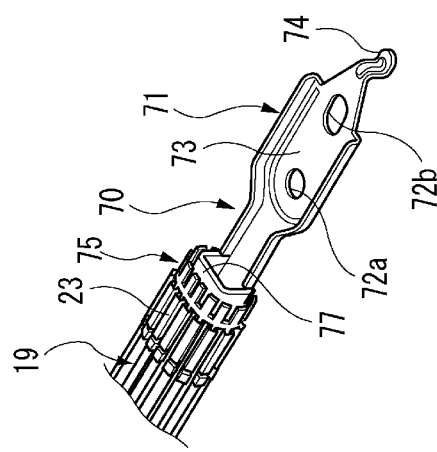

Then, in the ground joint terminal 70 to which the ground lines 19 (19A to 19X) have been connected collectively, the connection base portion 77 is bent longitudinally and formed into a rectangular cylindrical shape as shown in FIG. 8A. Further, the bent-like terminal connection portion 75 to which the ground lines 19 (19A to 19X) have been connected collectively is wound longitudinally around the outer circumferential portion of the rectangular cylindrical connection base portion 77 as shown in FIG. 8A.

Figure 8C:
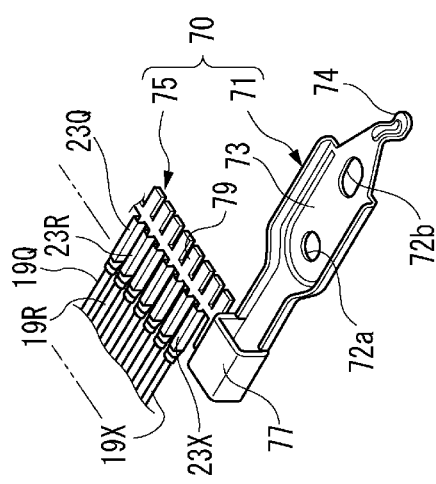

Finally, as shown in FIG. 8C, the circumference of the wound terminal connection portion 75 is covered with an adhesive sheet 90 so as to fix a winding end of the terminal connection portion 75. Thus, the collective connection of the ground lines 19 (19A to 19X) to the ground joint terminal 70 is completed.

As described above, the other terminal ends of the ground lines 19 (19A to 19X) are connected by use of the ground joint terminal 70 so that the connection work of the ground lines 19 (19A to 19X) can be carried out collectively and easily. Thus, when the ground lines 19 (19A to 19X) are once divided for each sub-harness and connected collectively in a subsequent step, the automation rate by a terminal insertion machine can be increased so that the post-fitting work of terminals at one terminal ends of the ground lines 19 can be reduced.

In addition, the ground joint terminal 70 is fixed to the ground surface such as the body of the vehicle in the state where the belt-like terminal connection portion 75 to which the ground lines 19 (19A to 19X) have been connected collectively has been wound longitudinally. Thus, the ground joint terminal 70 can be attached to the vehicle compactly.

Incidentally, the connection structure between the terminal connection portion of the ground joint terminal and the ground lines is not limited to the aforementioned terminal connection structure constituted by the tab terminals 78 of the terminal connection portion 75 and the terminals 23A to 23X constituted by female terminals with contact spring pieces. Various terminal connection structures may be used.

Figure 9A:
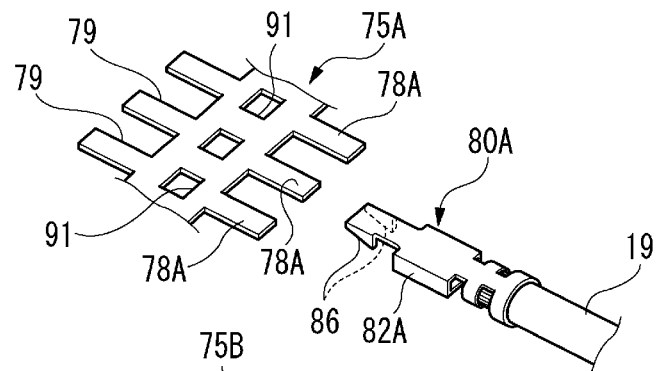
FIGS. 9A to 9D are main portion exploded perspective views for explaining modifications of connection between the other terminal ends of the ground lines and the ground joint terminal.

For example, a terminal connection structure shown in FIG. 9A is constituted by a terminal connection portion 75A of a ground joint terminal, and terminals 80A connected to the other terminal ends of the ground lines 19.

In the terminal connection portion 75A, a lock hole 91 is formed on the base portion side of each tab terminal 78A. In addition, each terminal 80A is integrally provided with a flat and rectangular cylindrical terminal connection portion 82A, and a pair of lock claws 86. The terminal connection portion 82A is fitted and inserted to one of the tab terminals 78A. The lock claws 86 are bent and formed on the front end side from the terminal connection portion 82A. The lock claws 86 are locked to corresponding one of the lock holes 91.

Thus, the tab terminal 78A is fitted and inserted to the terminal connection portion 82A to be surely electrically connected thereto, while the lock claws 86 are locked to the lock holes 91 so that the tab terminal 78A can be surely prevented from dropping out from the terminal connection portion 82A.

Figure 9B:
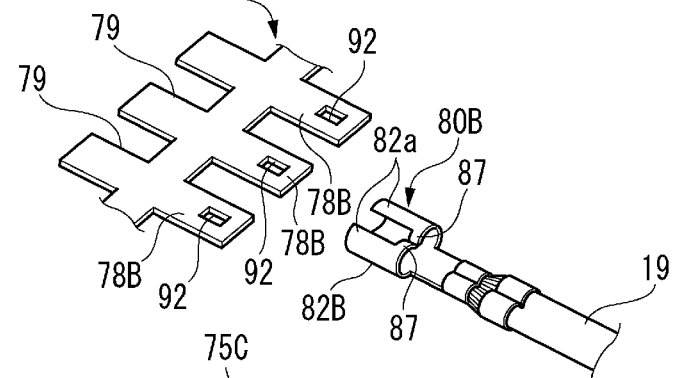

A terminal connection structure shown in FIG. 9B is constituted by a terminal connection portion 75B of a ground joint terminal, and terminals 80B connected to the other terminal ends of the ground lines 19.

In the terminal connection portion 75B, a lock hole 92 is formed on the front end side of each tab terminal 78B. In addition, each terminal 80B is integrally provided with a flat terminal connection portion 82B, and a pair of lock protrusions 87. The terminal connection portion 82B has a pair of lock pieces 82a to which the tab terminal 78B is fitted and inserted. The lock protrusions 87 are provided to protrude on the ground line 9 side of the pair of lock pieces 82a so that the lock protrusions 87 can be locked to the lock holes 92.

Thus, the tab terminal 78B is fitted and inserted to the flat terminal connection portion 82B to be surely electrically connected thereto, while the lock protrusions 87 are locked to the lock holes 92 so that the tab terminal 78B can be surely prevented from dropping out from the flat terminal connection portion 82B.

Figure 9C:
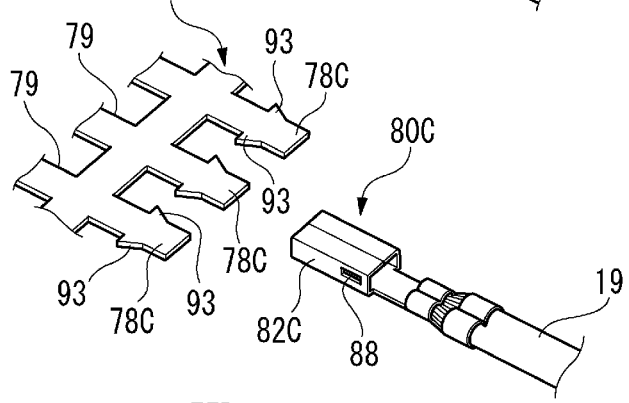

A terminal connection structure shown in FIG. 9C is constituted by a terminal connection portion 75C of a ground joint terminal, and terminals 80C connected to the other terminal ends of the ground lines 19.

In the terminal connection portion 75C, lock protrusions 93 are formed at opposite side edges on the front end side of each tab terminal 78C. In addition, each terminal 80C is integrally provided with a flat and rectangular cylindrical terminal connection portion 82C, and lock holes 88. The tab terminal 78C is fitted and inserted to the terminal connection portion 82C. The lock holes 88 are formed on the opposite surfaces on the ground line 9 side in the terminal connection portion 82C so that the lock holes 88 can lock the lock protrusions 93.

Thus, the tab terminal 78C is fitted and inserted to the terminal connection portion 82C of the terminal 80C to be surely electrically connected thereto, while the lock protrusions 93 are locked to the lock holes 88 so that the tab terminal 78C can be surely prevented from dropping out from the terminal connection portion 82C.

Figure 9D:
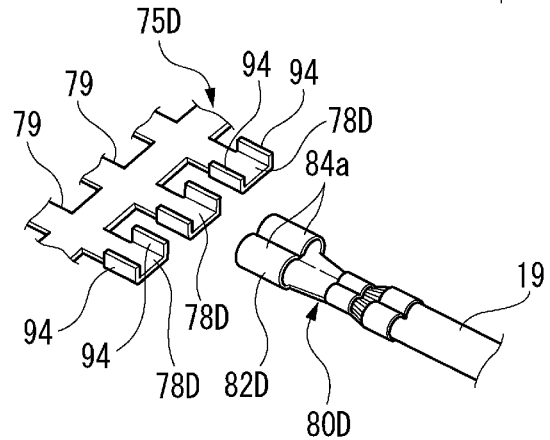
Figure 10:
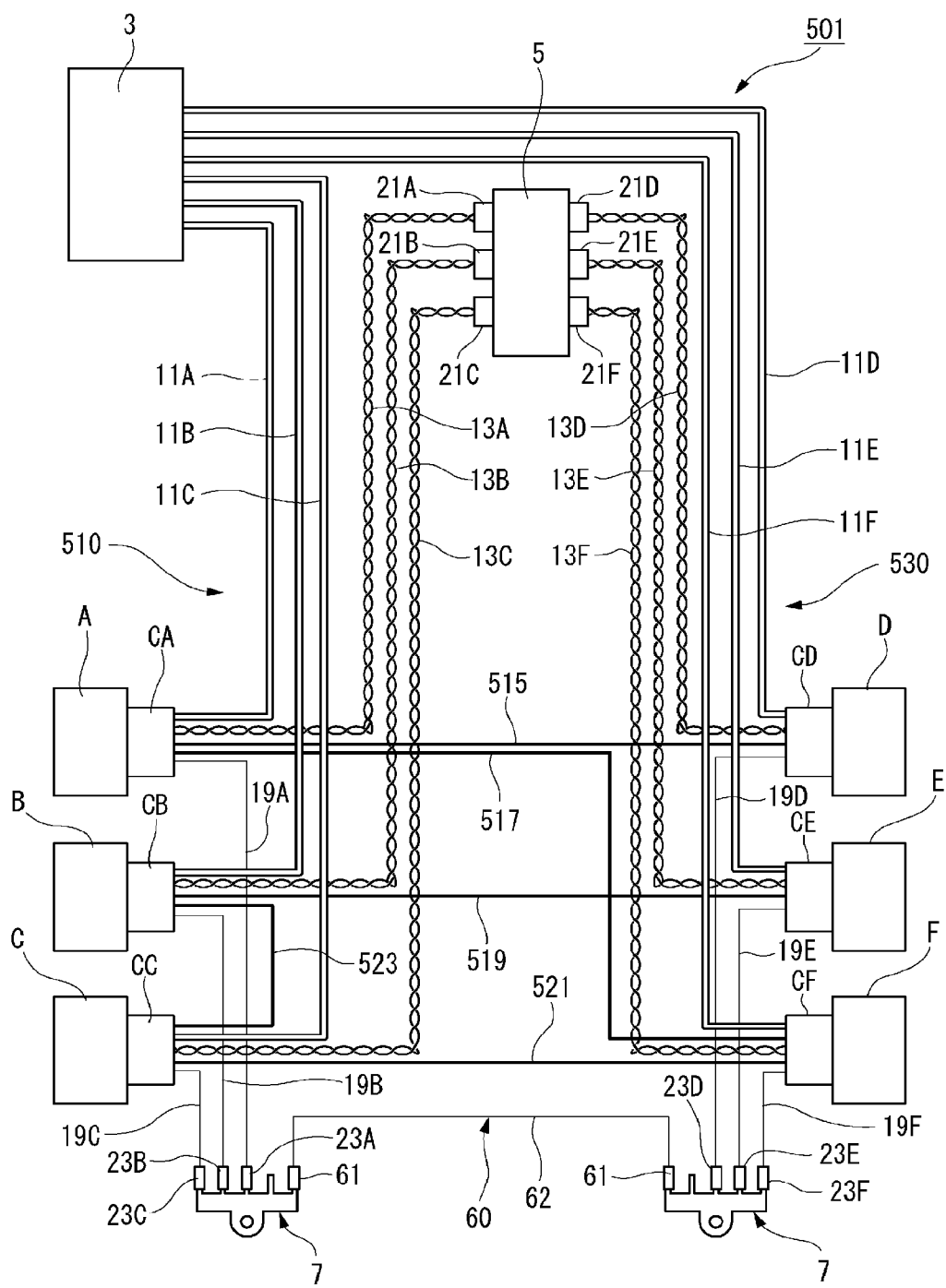
FIG. 10 is a schematic view showing an example of a related-art wire harness.
Figure 11:
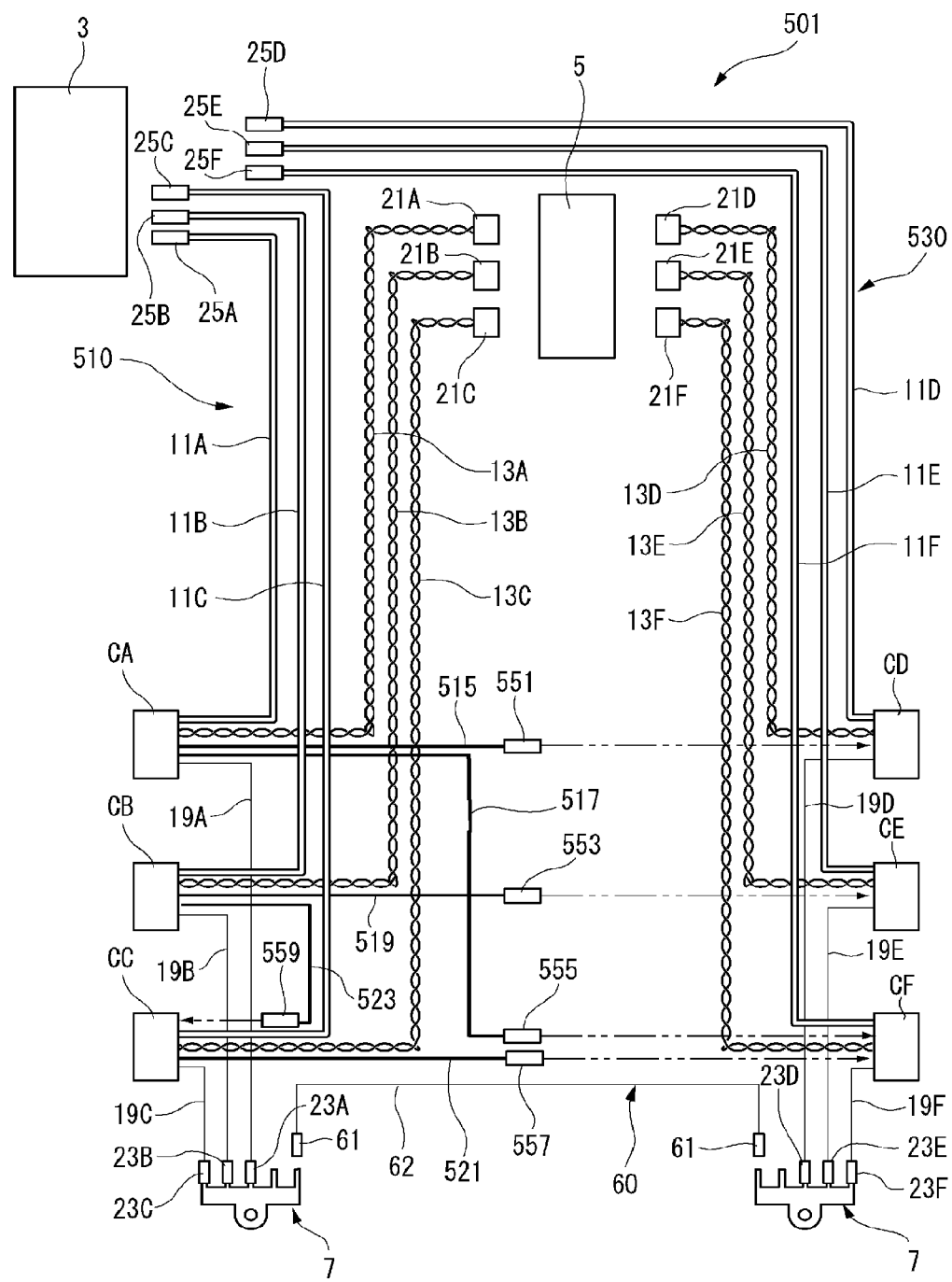
FIG. 11 is an exploded schematic view showing first and second sub-harnesses in the wire harness shown in FIG. 10.

A terminal connection structure shown in FIG. 9D is constituted by a terminal connection portion 75D of a ground joint terminal, and terminals 80D connected to the other terminal ends of the ground lines 19.

In the terminal connection portion 75D, engagement walls 94 are provided in opposite side portions of each tab terminal 78D. The engagement walls 94 serve as fastened caulking pieces, which protrude upward on one surface side.

In addition, a terminal connection portion 82D of each terminal 80D has a pair of fastening caulking pieces 84a, to which the tab terminal 78D is fitted and inserted. The fastening caulking pieces 84a are risen upward from the bottom portion of the terminal connection portion 82D individually. Further, an upper end portion of each fastening caulking piece 84a is bent and folded inward like an arc.

After the tab terminal 78D is inserted to the terminal connection portion 82D of the terminal 80D, the fastening caulking pieces 84a are caulked so that the fastening caulking pieces 84a can catch the opposite side portions of the tab terminal 78D and catch the engagement walls 94 of the tab terminal 78D from the outside. Thus, the engagement walls 94 are rounded inside the fastening caulking pieces 84a and received without any space, so that the terminal connection portion 82D can be filled with the tab terminal 78D.

Accordingly, the terminal connection portion 82D can be caulked and fastened to the tab terminal 78D firmly with high contact pressure, while conduction can be secured between the terminal connection portion 75D and the terminal 80D.

Here, the features of the aforementioned exemplary embodiment of a wire harness and a manufacturing method of the same according to the invention will be summarized and listed briefly below.

[1] A wire harness (1) including at least two sub-harnesses (first and second sub-harnesses 10 and 30) having a plurality of electric wires (power supply lines 11A to 11F, CAN communication lines 13A to 13C, general communication lines 15A to 17F, and ground lines 19A to 19F) whose one end portions are led out from a plurality of connector portions (connectors CA to CF) connected to a plurality of electric devices (A to F) respectively, wherein the other end portions of the electric wires (general communication lines 15A to 17F, and ground lines 19) to establish direct connection between the connector portions are electrically connected to each other by a connection mechanism (connection terminals 51 to 59, ground joint terminal 70).

[2] The wire harness (1) according to the aforementioned paragraph [1], wherein at least a part (connection terminals 51, 53, 55 and 57) of connection mechanisms in the electric wires (general communication lines 15A and 15D, general communication lines 17A and 17F, general communication lines 15B and 15E, general communication lines 15C and 15F, and general communication lines 17B and 17C) to establish direct connection between, of the connector portions, a plurality of pairs of connector portions (connectors CA to CF) respectively are disposed adjacently to one another.

[3] The wire harness according to the aforementioned paragraph [1], wherein the connection mechanism is a ground joint terminal (70) that electrically connects intermediate portions of ground lines (19) in the electric wires; wherein the ground joint terminal includes a terminal body (71), and a belt-like terminal connection portion (75) extending from the terminal body; wherein in one of side edge portions in a longitudinal direction of the terminal connection portion, a plurality of tab terminals (78) protruding in a direction perpendicular to the longitudinal direction of the terminal connection portion are disposed at predetermined intervals; and wherein the terminal connection portion in which terminals (23A to 23X) connected to the ground lines (19) are connected to the tab terminals is wound longitudinally.

[4] A manufacturing method of a wire harness (1) including at least two sub-harnesses (first and second sub-harnesses 10 and 30) having a plurality of electric wires (power supply lines 11A to 11F, CAN communication lines 13A to 13C, general communication lines 15A to 17F, and ground lines 19A to 19F) whose one end portions are led out from a plurality of connector portions (connectors CA to CF) connected to a plurality of electric devices (A to F) respectively, the manufacturing method including:

a sub-harness manufacturing step in which terminals provided in the one end portions of the electric wires (general communication lines 15A to 17F) whose other end portions are configured to be electrically connected to each other by a connection mechanism (connection terminals 51 to 59) in order to establish direct connection between the connector portions (connectors CA to CF) are inserted into the connector portions (connectors CA to CF) respectively in a state that the other end portions are separated from each other; and a harness manufacturing step in which the other end portions of the electric wires (general communication lines 15A to 17F) are electrically connected to each other by the connection mechanism (connection terminals 51 to 59) in order to establish direction connection between the connector portions.

[5] The manufacturing method of a wire harness according to the aforementioned paragraph [4], wherein the harness manufacturing step is carried out after the sub-harness manufacturing step.

[6] A connection structure of a ground joint terminal, including:

a ground joint terminal (70) including a terminal body (71), and a belt-like terminal connection portion (75) extending from the terminal body; and terminals (23A to 23X) connected to ground lines (19);

wherein a plurality of tab terminals (78) protruding in a direction perpendicular to a longitudinal direction of the terminal connection portion are disposed at predetermined intervals in one side edge portion so as to be arrayed in the longitudinal direction of the terminal connection portion; and wherein the terminal connection portion in which the ground lines are connected to the tab terminals through the terminals is wound in the longitudinal direction.

Incidentally, the invention is not limited to the aforementioned exemplary embodiment, but modifications, improvements, etc. may be made thereon suitably. In addition, materials, shapes, dimensions, numbers, arrangement places, etc., of constituent members in the aforementioned exemplary embodiment are not limited, but any materials, any shapes, any dimensions, any numbers, any arrangement places, etc. may be used as long as the invention can be attained.

What is claimed is:

1. A wire harness comprising:
at least two sub-harnesses including a plurality of electric wires whose one end portions are led out from a plurality of connector portions connected to a plurality of electric devices respectively,
wherein other end portions of the electric wires to establish direct connection between the connector portions are electrically connected to each other by a connection mechanism,
wherein the connection mechanism is a ground joint terminal that electrically connects intermediate portions of ground lines in the electric wires;
wherein the ground joint terminal includes a terminal body, and a belt-like terminal connection portion extending from the terminal body;
wherein in one of side edge portions in a longitudinal direction of the terminal connection portion, a plurality of tab terminals protruding in a direction perpendicular to the longitudinal direction of the terminal connection portion are disposed at predetermined intervals; and
wherein the terminal connection portion in which terminals connected to the ground lines are connected to the tab terminals is wound longitudinally.

2. A manufacturing method of a wire harness comprising at least two sub-harnesses including a plurality of electric wires whose one end portions are led out from a plurality of connector portions connected to a plurality of electric devices respectively, the manufacturing method comprising:
a sub-harness manufacturing step in which terminals provided in the one end portions of the electric wires whose other end portions are configured to be electrically connected to each other by a connection mechanism in order to establish direction connection between the connector portions are inserted into the connector portions respectively in a state that the other end portions are separated from each other; and
a harness manufacturing step in which the other end portions of the electric wires are electrically connected to each other by the connection mechanism in order to establish direction connection between the connector portions.

3. The manufacturing method of a wire harness according to claim 2, wherein the harness manufacturing step is carried out after the sub-harness manufacturing step.

4. A wire harness comprising:
a first sub-harness including:
a first connector portion configured to be connected to a first electrical device;
a first electric wire having one end portion connected to the first connector portion and an other end portion connected to a first terminal that is configured to be connected to a second electric device; and
a second electric wire having one end portion connected to the first connector portion and an other end portion;
a second sub-harness including:
a second connector portion configured to be connected to a third electrical device;
a third electric wire having one end portion connected to the second connector portion and an other end portion connected to a second terminal that is configured to be connected to the second electric device; and
a fourth electric wire having one end portion connected to the second connector portion and an other end portion; and
a first connection mechanism connected to each of the other end portions of the second and fourth electric wires such that the second and fourth electric wires establish a direct connection between the first and second connector portions and the first connection mechanism electrically connects the first and second connector portions to each other.

5. The wire harness according to claim 4, further comprising a second connection mechanism, wherein
the first sub-harness further includes:
a third connector portion configured to be connected to a fourth electrical device; and a fifth electric wire having one end portion connected to the third connector portion and an other end portion, the second sub-harness further includes:
  a fourth connector portion configured to be connected to a fifth electrical device; and
  a sixth electrical wire having one end portion connected to the fourth connector and an other end portion;

the second connection mechanism connecting each of the other end portions of the fifth and sixth electric wires such that the fifth and sixth electric wires establish a direct connection between the third and fourth connector portions and the second connection mechanism electrically connects the third and fourth connector portions to each other, and the second connection mechanism is adjacent to the first connection mechanism.

\* \* \* \* \*